United States Patent Office 3,458,308
Patented July 29, 1969

3,458,308
PROCESS FOR PRODUCTION OF CATALYST FROM PYROPHORIC BISMUTH
Wolfgang Karl Heinz Muller, Offenbach am Main, Germany, assignor to Hans J. Zimmer, Aktiengesellschaft
No Drawing. Filed July 28, 1966, Ser. No. 568,406
Int. Cl. C22b 37/00; B01j 11/06
U.S. Cl. 75—108                     8 Claims

ABSTRACT OF THE DISCLOSURE

A process for the production of a highly active pyrophoric bismuth catalyst useful to catalyze esterification or transesterification reactions. An aqueous solution of a bismuth compound of a concentration, calculated as bismuth, of from one to twenty percent by weight is precipitated with a reducing agent while there is added in small increments an aqueous solution of a base at temperatures from 10 to 90° C., preferably 30 to 70° C. A preferred reducing agent is formaldehyde. The mixture is allowed to stand for from 20 minutes to 1 hour and soluble components are removed by washing. The catalyst may be then dried under a vacuum.

---

This invention relates to a novel method for preparing a catalyst useful to catalyze esterification or transesterification reactions.

It is known that finely divided bismuth acts as an esterification or transesterification (ester interchange) catalyst. Such a catalyst is described in German Patent No. 972,503. It is also known that bismuth metal has different catalytic effects, depending on the conditions of its production.

I have now found that it is possible to produce a bismuth catalyst which is so finely distributed that it ignites spontaneously in air at room temperature or at least oxidizes appreciably. The metal thus produced has a much greater catalytic efficiency than commercially available metal powders or similar preparations and is well suited as an esterification or transesterification catalyst.

It is therefore the object of my invention to provide a process for the production of a highly active catalyst from pyrophoric bismuth. In my process, an aqueous solution of a bismuth compound of a concentration, calculated as bismuth, of 1 to 20% by weight is precipitated with a reducing agent while there is added in small increments an aqueous solution of a base at temperatures from 10 to 90° C., preferably 30 to 70° C. The mixture is allowed to stand for at least 20 minutes.

For precipitation of the bismuth catalyst, any water-soluble bismuth compound may be the starting material, preferably bismuth chloride or bismuth nitrate. It is also possible to use complex bismuth tartrate solutions. The minimum concentration of the acid bismuth solution from which precipitation is practical is about 1% by weight, the maximum concentration being about 20% by weight, in each case the percentage being with reference to bismuth. Suitable reducing agents are oxo compounds readily soluble in water, such as, for example, glucose, and easily oxidized aldehydes. Formaldehyde is preferred. It is also possible to use as reducing agents hydrazine, hydroxylamine, hypophosphite, ascorbic acid and nonprecious metals, such as magnesium or zinc.

As precipitating agents all known alkali hydroxides are suitable, preferably sodium hydroxide or potassium hydroxide. The hydroxide required for precipitation is added in several portions under good agitation. The precipitation can be carried out in the temperature range from 10 to 90° C. The preferred range is 30 and 70° C. After addition of the entire amount of hydroxide necessary for precipitation, the reaction mixture should be allowed to stand for at least 20 minutes, preferably for at least 1 hour. The precipitated catalyst is then washed with a nonoxidizing acid and subsequently with a suitable washing agent, preferably water, until all the components soluble in water are removed.

The following example illustrates my invention but is not intended to limit the scope thereof.

EXAMPLE 260 parts of bismuth hydroxide were dissolved in 800 parts of 32% hydrochloric acid and the resulting acid bismuth chloride solution diluted with 2,000 parts of water. There was then added to the mixture about 1,500 to 1,600 parts of 10% aqueous sodium hydroxide, and under good agitation, 1,000 parts of a 38% aqueous formaldehyde solution. Upon reaching a temperature of 60° C., the remaining 10% sodium hydroxide (difference to 3,000 parts) were added and the reaction mixture was agitated for a total of two hours. A precipitate formed and turned dark during this time.

After the above-indicated reaction time, the liquid was decanted from the precipitate and the precipitate was digested with hydrochloric acid and thereupon washed with distilled water under exclusion of oxygen, until the washing water reacted neutral. The catalyst thus produced was then dried under a vacuum.

Having described my invention, I claim:

1. Process for making highly active pyrophoric bismuth catalyst useful to catalyze esterification or transesterification reactions comprising (1) reacting an aqueous solution of water soluble bismuth compound with an aqueous solution of an alkali metal hydroxide in the presence of a reducing agent at a temperature from 10° C. to 90° C., and (2) allowing the reaction mixture to stand while bismuth separates therefrom as precipitate, (3) separating from said precipitate said pyrophoric bismuth.

2. Process of claim 1 wherein said reducing agent is formaldehyde.

3. Process of claim 1 wherein said separation includes washing said precipitate first with a dilute solution of a nonoxidizing acid and then with water until free of salts.

4. Process of claim 1 wherein said aqueous bismuth solution contains 1 to 20% by weight bismuth.

5. Process of claim 1 wherein said temperature is 30° to 70°.

6. Process of claim 1 wherein said reaction mixture is allowed to stand at least 20 minutes.

7. Process of claim 1 wherein said aqueous solution of base is added to said aqueous solution of bismuth compound in small increments.

8. Process of claim 1 wherein said base is sodium hydroxide or potassium hydroxide.

References Cited

UNITED STATES PATENTS

| 1,547,236 | 7/1925 | Reyerson | 252—456 |
| 2,716,057 | 8/1955 | Whaley | 75—109 |
| 2,752,237 | 6/1956 | Short | 75—108 |
| 2,885,282 | 5/1959 | Neipert et al. | 75—101 |

FOREIGN PATENTS 972,503   7/1959   Germany.

L. DEWAYNE RUTLEDGE, Primary Examiner

T. R. FRYE, Assistant Examiner

U.S. Cl. X.R.

75—.5

UNITED STATES PATENT OFFICE

CERTIFICATE OF CORRECTION

Patent No. 3,458,308　　　　　　　　　　　　　　Dated July 29, 1969

Wolfgang Karl Heinz Muller

It is certified that error appears in the above-identified patent and that said Letters Patent are hereby corrected as shown below:

In column 1, line 5, the name of the assignee "Hans J. Zimmer, Aktiengesellschaft" is incorrect and should read -- Vickers-Zimmer, Aktiengesellschaft, Planung und Bau von Industrieanlagen --.

SIGNED AND
SEALED
FEB 17 1970

(SEAL)
Attest:

Edward M. Fletcher, Jr.
Attesting Officer

WILLIAM E. SCHUYLER, JR.
Commissioner of Patents